TUNABLE CAVITY RESONATOR ELECTRON DISCHARGE DEVICE

Filed March 24, 1954 2 Sheets-Sheet 1

INVENTOR
CHARLES V. LITTON
BY R P Morris
ATTORNEY

Sept. 23, 1958 C. V. LITTON 2,853,647

TUNABLE CAVITY RESONATOR ELECTRON DISCHARGE DEVICE

Filed March 24, 1954 2 Sheets-Sheet 2

INVENTOR
CHARLES V. LITTON

BY R P Morris

ATTORNEY

United States Patent Office 2,853,647

Patented Sept. 23, 1958

2,853,647

TUNABLE CAVITY RESONATOR ELECTRON DISCHARGE DEVICE

Charles V. Litton, Redwood City, Calif., assignor to Litton Industries, Inc.

Application March 24, 1954, Serial No. 418,303

4 Claims. (Cl. 315—5.47)

This invention relates to electron discharge devices, and more particularly to tunable electron discharge devices provided with cavity resonators, such as velocity modulation type tubes.

In tunable resonator type tubes, using two or more resonators, such as some forms of velocity modulation tubes it is desirable that a tuning mechanism be used which will simultaneously tune all the resonators. It is known to tune such resonators by using flexible deformable wall portions, or retractable tuning stubs inserted radially into the resonators. Such tuners are not satisfactory in all cases. It is difficult to achieve a wide tuning range by use of flexible walls alone. Also in the use of tuning stubs the resonator is not symmetrically varied and thus may tend to develop other modes of oscillation, reducing the efficiency of the system.

Furthermore, when a tunable velocity modulation tube is used as an amplifier, it is desirable that the input and output coupler be coupled to the resonator in such a manner that proper impedance ratios be achieved throughout the tuning range.

It is an object of this invention to provide a tuning device, for an electron discharge device, and more particularly for velocity modulation type tubes, having annular cavity resonators, which will avoid the shortcomings of the prior art devices, and which may be constructed to provide simultaneous uniform tuning of two or more resonators, and when the device is used as an amplifier, to provide input and/or output coupling which will be efficient over the entire tuning range.

With these objects in view, a feature of this invention comprises a tuner for use in an electron discharge device, for instance of the velocity modulation type, in which is provided an annular resonator having outer and inner walls, the inner wall of which is substantially cylindrical and provided with a gap within the resonator for interaction of an electron beam therewith, the electron beam being projected along the tube formed by the inner wall, said tuner comprising an annular plunger between the walls and arranged for axial movement between one of the end walls of the resonator and the gap in the inner wall. Preferably two or more of these resonators are axially aligned and the electron beam is projected through these resonators in turn, and each of the resonators is provided with a similar tuning device. External control means are provided so that the tuning plungers may be simultaneously adjusted equal amounts in each of the resonators. Furthermore, separate adjustment means to give fine tuning adjustment of the individual resonators is connected with this common control means. In addition input and output coupler means for transfer of energy to be amplified, are arranged so as to supply energy into and out of the initial and terminating resonators respectively, through openings in the outer wall arranged in the space normally transversed by the tuning plungers. By this construction a uniform impedance coupling may be achieved throughout the entire tuning range of the amplification construction.

The above-mentioned and other features and objects of this invention and the manner of attaining them will become more apparent and the invention itself will be best understood by reference to the following description of an embodiment of the invention taken in conjunction with the accompanying drawings, in which.

Figures 1, 2, 3:
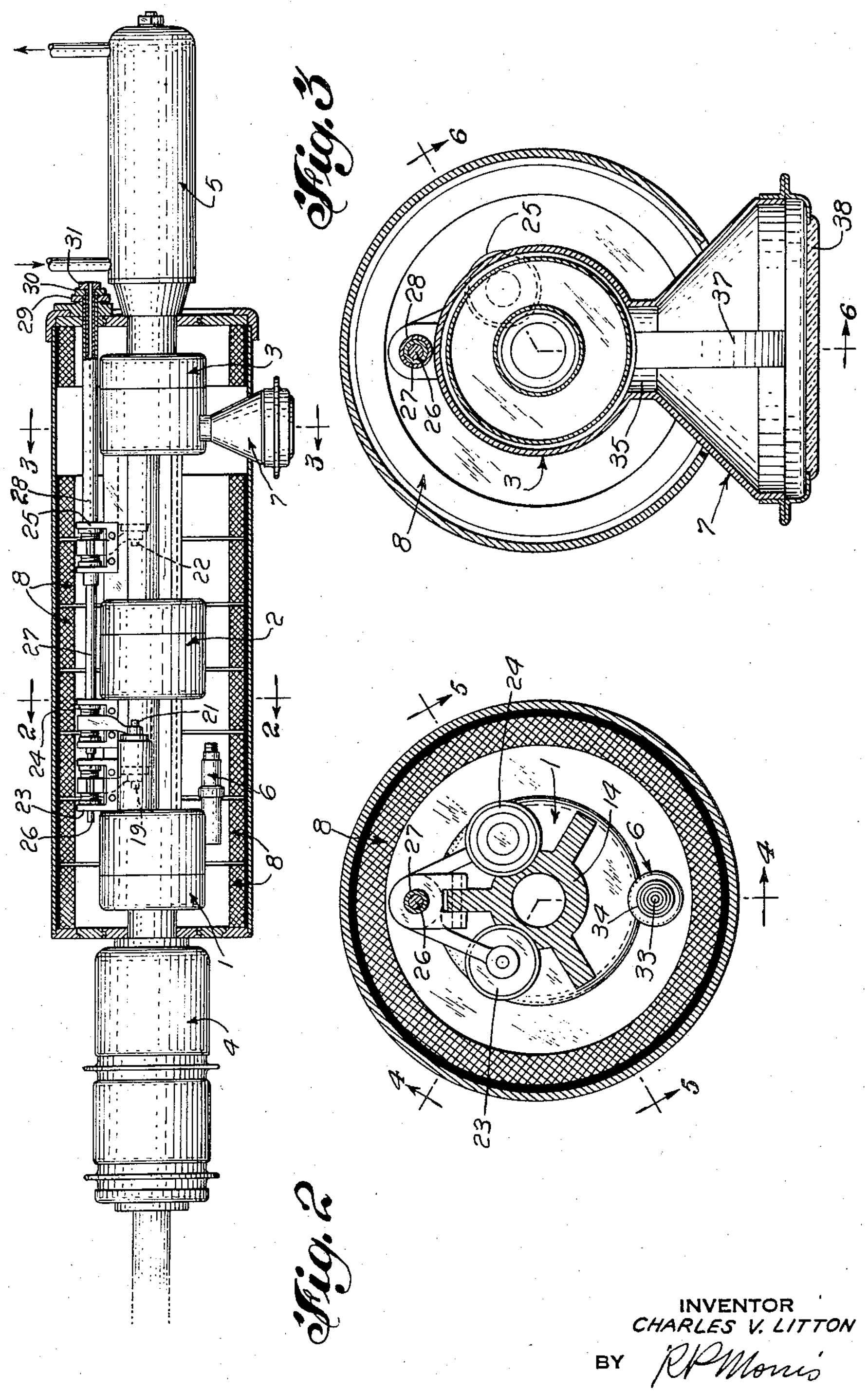
Fig. 1 is a view partly in section of an electron discharge device incorporating the features of this invention.
Fig. 2 is a transverse cross-sectional view of the electron discharge device taken along the line 2—2 of Fig. 1.
Fig. 3 is a transverse cross-sectional view of the electron discharge device taken along the line 3—3 of Fig. 1.

Turning now to the drawing there is shown a velocity modulation tube having three separate resonators 1, 2 and 3 mounted in coaxial alignment so that energy from an electron beam source 4 may be projected axially through each of these resonators. The resonators together with the beam source 4 and the collector electrode illustrated at 5, form a type of electron discharge device commonly known as a "klystron" of the three-resonator type. Generally, the spacing between resonators 2 and 3 should be an odd number of quarter wavelengths of the space charge wavelength. An input coupler is illustrated at 6 as a coaxial line and an output coupler in the form of a wave guide is shown at 7. Thus, energy may be applied into the tube for amplification therein. The usual magnetic circuit for maintaining the electron beam in focus is provided by the coils 8 and the associated structure.

It is often desired to tune such an electron-discharge device over a frequency band. The structure of the individual resonators and tuners may best be seen by referring to Figs. 4, 5 and 6.

Figure 4:
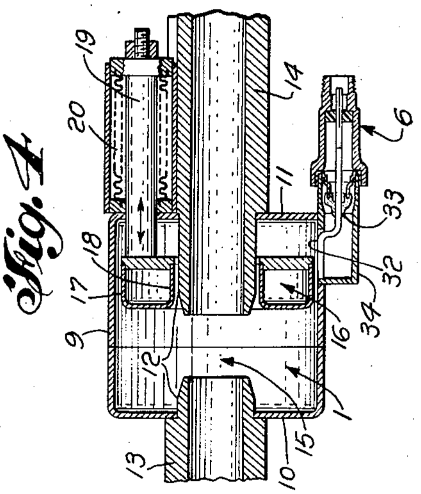
Fig. 4 is an enlarged cross-sectional view of the resonator construction taken along the line 4—4 of Fig. 2, transversally of the input resonator.

Turning to Fig. 4, it can be seen that the input resonator 1 comprises an outer cylindrical wall 9 with two end walls 10 and 11 and an inner wall 12, formed by two tubular elements 13, 14 spaced apart as shown at 15 to provide a gap. Elements 13 and 14 preferably are made to extend through walls 10 and 11, respectively, and form with outer wall 9 a substantially toroidal cavity resonator. The tuning element comprises a plunger 16 extending across the resonator between the inner wall formed by 11 and the outer wall 9 of the resonator. The plunger preferably is provided with flanges 17, 18 extending back toward end wall 11, so that a narrow annular passage exists between this plunger and the outer wall of the resonator. The control rod 19 is fastened to the plunger and the vacuum seal is completed by Sylphon bellows 20 so that the axial movement of rod 19 and plunger 16 is permitted. An input coupler 6 is arranged to supply energy, to be amplified, to this resonator.

Figure 5:
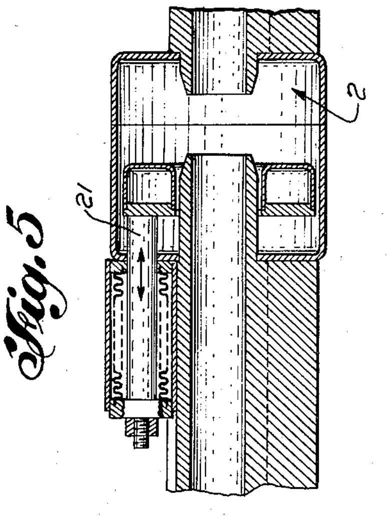
Fig. 5 is a sectional view taken along a line 5—5 of Fig. 2, transversally of the center resonator.

The resonator 2, shown in Fig. 5, is substantially similar to resonator 1 except that the tuning element is shown normally mounted at the left of the resonator instead of the right as in the case of resonator 1. Furthermore, there is no input coupling arrangement associated with this resonator. The tuning rod for this resonator is indicated at 21.

Figure 6:
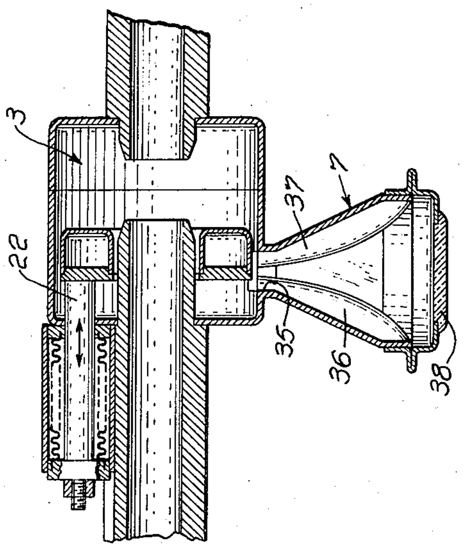
Fig. 6 is a sectional view taken along the line 6—6 of Fig. 3 transversally of the output resonator.

In Fig. 6 resonator 3 is shown substantially in the same construction as resonator 2 except that here the output wave guide coupler 7 is illustrated coupled to the resonator. The tuning rod for this resonator is designated at 22.

Returning now to Fig. 1 and considering this in connection with Figs. 2 and 3 the control mechanism for the operation of the tuning plungers is illustrated. Each of the tuning control rods 19, 21, and 22 is associated with individual driving means 23, 24 and 25 arranged about the central tubular members 14 so as to be in non-conflicting positions. Thus 23 and 24 are off-set equal distance on opposite sides of this tube while driving member 25, which is axially spaced from the others, may be in the same relative angular position as driving means 24. A combined control shaft may be used, consisting of a central shaft 26, an outer hollow shaft 27 and a still larger outer hollow shaft 28, for driving the individual tuning plunger control rods 19, 21 and 22. Separate individual control knobs 29, 30 and 31 may be fastened to shafts 26, 27 and 28, respectively, to provide for a trimming adjustment of the individual plungers to tune the resonators to the operating frequencies. However, once this adjustment is made these three knobs may be operated in unison to produce simultaneous equal displacement of tuning plungers in resonators 1, 2 and 3. The individual knobs may be tightly engaged so as normally to operate together, or any well known means may be used to lock them together after trimmer adjustments have been made.

Because of the wide tuning range which can be produced by use of the annular plungers in the toroidal resonators it may be desirable to have the energy transfer couplers particularly arranged to provide substantial impedance match throughout the entire operating frequency range. This is accomplished by providing input and output couplers positioned in the area of movement of the tuning plungers at the input and output resonators respectively.

Turning again to Fig. 4, it can be seen that an annular spacing is provided between tuning plunger 16 and the outer wall 9 of resonator 1. This spacing is the same as the plunger is moved because of the flange 17. Thus, an impedance, which is relatively constant is presented regardless of the position of the plunger with respect to the resonator cavity. Accordingly, the input coupler 6, shown as a coaxial line, is positioned to apply the energy across an opening 32 in the outer wall 9 in the area of the plunger. The inner conductor 33 of the line 6 is connected at one edge of this opening and the outer conductor 34 is extended to the other edge of this opening. Since the impedance in this area is substantially constant regardless of the adjustment of the plunger the impedance match will not be upset by variations in tuning. Likewise, the spacing between the edges of the plunger 16 and wall 9 is such that this presents a relatively higher impedance to the energy oscillating within the resonator and losses are, therefore, minimised.

In Fig. 6 the output coupler wave guide is shown mounted through a coupling gap 35 similar to gap 32 of Fig. 4 and similarly positioned. The output wave guide may be provided with internal, impedance matching ramps 36, 37 and may be sealed by a window of insulating material 38. This type of output wave guide horn is commonly used as the output coupler for magnetron tubes.

While this invention has been described in connection with a specific form of velocity modulation tube it will be readily realised that the invention is applicable to other types of tube construction wherein toroidal cavity resonators must be tuned simultaneously to different frequency values. It is to be clearly understood that this description is made only by way of example and not as a limitation to the scope of my invention as set forth in the objects thereof and in the accompanying claims.

What is claimed is:

1. In an electron discharge device having, a coaxial annular cavity resonator comprising an outer substantially cylindrical wall, a pair of end walls connected to said outer cylindrical wall, an inner substantially tubular wall provided with a coupling gap intermediate its ends, the end walls having openings communicating with the tube formed by said inner wall, and an electron beam source for directing an electron beam longitudinally through said openings, a tuning means for said resonator comprising an annular plunger movably mounted within said resonator between said outer and inner walls for movement between the one end and said gap, said plunger having a substantially planar face substantially parallel with said end walls, and a cylindrical flange at its outer periphery extending away from said gap substantially parallel with said outer cylindrical wall, control means external of said resonator for adjustably controlling movement of said plunger, a coupling opening in said outer cylindrical wall in the region covered by said flange and an energy transfer means communicating with said resonator through said opening.

2. An electron discharge device amplifier comprising, a plurality of annular cavity resonators mounted in axially aligned position, each of said resonators having an outer tubular wall, relatively rigid end walls connected to said outer wall, and an inner tubular wall coaxial with said outer wall and provided with a gap of fixed length intermediate said end walls, said end walls having openings communicating with the tube formed by said inner wall, an electron beam source mounted at one end of said axially aligned resonators for directing an electron beam axially through said openings for coaction with said resonators through said gaps, a tuning means for each of said resonators comprising an annular plunger movably mounted within the corresponding resonator between said outer wall and said inner wall for movement between one of said ends walls and said gaps, control means mounted externally of said resonators for controlling movement of said plungers, individual operating means for said control means to separately adjust the positions of said plungers and a common operating means for said control means to adjust the positions of said plungers substantially simultaneously and equally.

3. An electron discharge device amplifier comprising a plurality of annular cavity resonators mounted in axially aligned position, each of said resonators having an outer tubular wall, spaced substantially planar end walls connected to said outer wall, and an inner tubular wall coaxial with said outer wall and provided with a gap intermediate said end walls, said end walls having openings communicating with the tube formed by said inner wall, an electron beam source mounted at one end of said axially aligned resonators for directing an electron beam axially through said openings for coaction with said resonators through said gaps, a tuning means for each of said resonators comprising an annular plunger movably mounted within the corresponding resonator between said outer wall and said inner wall for movement between one of said end walls and said gap, control means mounted externally of said resonators for controlling movement of said plungers, and a common operating means for said control means to adjust the positions of said plungers substantially simultaneously and equally, and energy transfer coupling means coupled to one of said resonators through the outer tubular wall in the region of movement of its associated tuning plunger.

4. An electron discharge device amplifier comprising a plurality of annular cavity resonators mounted in axially aligned position, each of said resonators having an outer tubular wall, spaced substantially planar end walls connected to said outer cylindrical wall, and an inner tubular wall coaxial with said outer wall and provided with a gap intermediate said end walls, said end walls having openings communicating with the tube formed by said inner wall, an electron beam source mounted at one end of said axially aligned resonators for directing an electron beam axially through said openings for coaction with said resonators through said gaps, a tuning means for each of said resonators comprising an annular plunger movably mounted within the corresponding resonator between said outer walls and said inner wall for movement between one of said end walls and said gap, control means mounted externally of said resonators for controlling movement of said plungers, a common operating means for said control means to adjust the positions of said plungers substantially simultaneously and equally, an energy input coupling means coupled to the resonator adjacent said electron beam source through the outer tubular wall in the region of movement of its associated tuning plunger, and an energy output coupler coupled to the resonator furthest from said electron source through the tubular outer wall, in the region of movement of its associated tuning plunger.

References Cited in the file of this patent

UNITED STATES PATENTS

| | | |
|---|---|---|
| 2,222,902 | Hahn | Nov. 26, 1940 |
| 2,280,824 | Hansen et al. | Apr. 28, 1942 |
| 2,432,571 | Haeff | Dec. 16, 1947 |
| 2,436,397 | Morton | Feb. 24, 1948 |
| 2,475,652 | Varian et al. | July 12, 1949 |
| 2,484,643 | Peterson | Oct. 11, 1949 |
| 2,523,122 | Kuper et al. | Sept. 19, 1950 |
| 2,623,194 | Jenks | Dec. 23, 1952 |
| 2,659,025 | Huggins | Nov. 10, 1953 |

FOREIGN PATENTS

| | | |
|---|---|---|
| 630,110 | Great Britain | Oct. 5, 1949 |